US012691546B2

(12) United States Patent
Wei et al.

(10) Patent No.: US 12,691,546 B2
(45) Date of Patent: Jul. 28, 2026

(54) ROLLER TAPER GRINDING METHOD FOR PLANETARY ROLLER SCREW MECHANISM

(71) Applicant: CHONGQING UNIVERSITY, Chongqing (CN)

(72) Inventors: Peitang Wei, Chongqing (CN); Rui Hu, Chongqing (CN); Xuesong Du, Chongqing (CN); Jie Zhou, Chongqing (CN); Pengliang Zhou, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 640 days.

(21) Appl. No.: 18/205,723

(22) Filed: Jun. 5, 2023

(65) Prior Publication Data

US 2024/0131650 A1     Apr. 25, 2024

(30) Foreign Application Priority Data

Oct. 14, 2022     (CN) .......................... 202211260423.8

(51) Int. Cl.
B24B 19/02         (2006.01)
B23F 9/02         (2006.01)

(52) U.S. Cl.
CPC .............. B24B 19/022 (2013.01); B23F 9/02 (2013.01)

(58) Field of Classification Search
CPC ....... B24B 19/022; B24B 19/06; B23F 21/02; B23F 9/02; B23Q 15/013; B23Q 15/12; B23Q 15/14; B23Q 15/26
USPC ............... 451/47, 5, 11, 900; 409/37, 38, 49
See application file for complete search history.

(56) References Cited

U.S. PATENT DOCUMENTS

| | | | | |
|---|---|---|---|---|
| 2009/0049942 A1* | 2/2009 | Miyaoku | ................. | F16H 55/08 74/462 |
| 2015/0217388 A1* | 8/2015 | Guo | ......................... | B24B 49/02 700/98 |
| 2017/0008106 A1* | 1/2017 | Wuerfel | ................. | G05B 19/29 |
| 2019/0283207 A1* | 9/2019 | Yamanaka | .............. | B24B 49/04 |

* cited by examiner

*Primary Examiner* — Monica S Carter
*Assistant Examiner* — Marcel T Dion
(74) *Attorney, Agent, or Firm* — Birchwood IP

(57)         ABSTRACT

Disclosed is a roller taper grinding method for a planetary roller screw mechanism. The method includes steps as follows: step 1: determining basic parameters and a bearing capacity of a planetary roller screw mechanism to be machined; step 2: establishing deformation and force balance equations of the planetary roller screw mechanism according to the basic parameters and the bearing capacity of the planetary roller screw mechanism determined in step 1; step 3: iteratively computing an optimal grinding taper angle of roller grinding according to the deformation and force balance equations established in step 2; step 4: determining process parameters of roller grinding; and step 5: grinding a roller taper of the planetary roller screw mechanism by a machine tool according to the process parameters determined in step 4.

4 Claims, 4 Drawing Sheets

ROLLER TAPER GRINDING METHOD FOR PLANETARY ROLLER SCREW MECHANISM

CROSS REFERENCE TO RELATED APPLICATION

This patent application claims the benefit and priority of Chinese Patent Application No. 202211260423.8, filed with the China National Intellectual Property Administration on Oct. 14, 2022, the disclosure of which is incorporated by reference herein in its entirety as part of the present application.

TECHNICAL FIELD

The present disclosure relates to the field of planetary roller screw mechanism machining, and particularly to a roller taper grinding method for a planetary roller screw mechanism.

BACKGROUND

The planetary roller screw mechanism is a novel mechanism for switching between a rotary motion and a linear motion. As shown in FIG. 1, it includes a screw 1, rollers 2, a nut 3, a retainer ring 4, an inner gear ring 5 and a retainer 6. Force is transferred through thread contact among the screw 1, the rollers 2 and the nut 3. Generally, 6-12 rollers are uniformly distributed around the screw. With such a planetary structure, the planetary roller screw mechanism outperforms other linear transmission mechanisms such as a hydraulic cylinder, a trapezoidal thread and a ball screw for its outstanding advantages of high bearing capacity, high rigidity, high precision, impact resistance and the like. Thus, the planetary roller screw mechanism has been extensively applied to the fields of aerospace, weaponry, medical apparatuses and so on. Moreover, with the rapid development of mechanical-electrical integration of mechanical apparatuses, the planetary roller screw mechanism will be further applied and have broad application prospects.

As a kind of thread transmission mechanism, the planetary roller screw mechanism has an inherent characteristic that loads are nonuniformly distributed on threads, that is, a minority of threads share a majority of the loads. Nonuniform load distribution will severely affect a bearing capacity of the planetary roller screw mechanism, aggravate localized wear, shorten service life, and lead to unstable operation and other problems. However, due to differences in structure and function, uniform load distribution machining methods, for example, nut internal beveling and nut fraising for a common connection thread cannot be applied to the planetary roller screw mechanism. Therefore, it is necessary to develop, according to characteristics of the planetary roller screw mechanism, a special-purpose uniform load distribution machining method.

In view of the above problems, existing technical solutions mainly include thread-pitch-varying machining, axial-speed-varying machining and roller-segmenting machining. However, the above technical solutions have prominent problems during actual machining as follows: (1) Since a change amount of a thread pitch during thread-pitch-varying machining is sufficiently small, which is generally about 1 micron and is highly likely to be covered with a machining error, and accordingly, extremely high demands on machining apparatuses are made. If machining accuracy is unachievable, the loads cannot be uniformly distributed, and a risk of thread interference after assembly of the planetary roller screw mechanism may occur. (2) Axial-speed-varying machining requires a tool to maintain certain acceleration during machining so as to change a speed. However, on account of limitation of a transmission chain of a machine tool, most existing thread grinders cannot achieve time-varying speed during machining, so it is difficult to implement this technical solution. (3) Roller-segmenting machining is to divide rollers into multiple segments for grinding, which will inescapably reduce grinding efficiency and is not conducive to mass production. Therefore, the existing uniform load distribution machining solutions for a planetary roller screw mechanism involve relatively high machining cost and technical difficulty, and are not beneficial to batch production and popularization.

SUMMARY

An objective of the present disclosure is to provide a roller taper grinding method for a planetary roller screw mechanism, so as to solve the technical problem that in a load distribution machining solution for a roller screw mechanism at present, a relatively large machining pump and a high technical level are required, which is not conducive to batch production and popularization.

In order to solve the above technical problem, the present disclosure employs a technical solution as follows:

a roller taper grinding method for a planetary roller screw mechanism in the present disclosure includes steps as follows:

step 1: determining basic parameters and a bearing capacity of a planetary roller screw mechanism to be machined;

step 2: establishing deformation and force balance equations of the planetary roller screw mechanism according to the basic parameters and the bearing capacity of the planetary roller screw mechanism determined in step 1;

step 3: iteratively computing an optimal grinding taper angle of roller grinding according to the deformation and force balance equations established in step 2;

step 4: determining process parameters of roller grinding; and step 5: grinding a roller taper of the planetary roller screw mechanism by a machine tool according to the process parameters determined in step 4.

Further, the basic parameters of the planetary roller screw mechanism in step 1 include major diameters, nominal diameters, minor diameters, thread angles, helix angles, thread pitches, thread starts of a screw, a roller and a nut, an external diameter of the nut, an arc radius of the roller, number of rollers, and number of threads per roller Further, the deformation and force balance equations of the planetary roller screw mechanism established in step 2 are:

$$\begin{cases} P_S + \Delta l_{Si} = P_R + \Delta l_{SRi} \pm P_R \tan \gamma \\ P_N + \Delta l_{Ni} = P_R + \Delta l_{NRi} \pm P_R \tan \gamma \\ \sum_{i=1}^{N_t} F_{SRi} = \dfrac{F}{Z_R} \\ \sum_{i=1}^{N_t} F_{NRi} = \dfrac{F}{Z_R} \end{cases}$$

where $P_S$, $P_R$ and $P_N$ are the thread pitches of the screw, the roller and the nut respectively; i is a thread number of the roller, i=1, 2, 3, . . . , $N_t$, and $N_t$ is number of threads per roller; $\Delta l_{Si}$ and $\Delta l_{Ni}$ are axial deformation at an $i_{th}$ segment of the screw and the nut respectively; $\Delta l_{SRi}$ and $\Delta l_{NRi}$ are axial deformation of the roller on a screw side and a nut side respectively; $\gamma$ is a grinding taper angle of the roller; $F_{SRi}$ and $F_{NRi}$ are axial forces borne by an $i_{th}$ thread on the screw side and the nut side respectively; F is a load value of the planetary roller screw mechanism; $Z_R$ is a number of rollers; and ± indicates a tension and compression state of the screw or the nut, + indicates tension, and − indicates compression.

Further, in step 3 of iteratively computing an optimal grinding taper angle according to the deformation and force balance equations established in step 2, the grinding taper angle $\gamma$ of the roller in the deformation and force balance equations in step 2 is gradually increased from 0, and corresponding axial forces $F_{SRi}$ and $F_{NRi}$ borne by the thread on the screw side and the nut side may be obtained in the case of any $\gamma$; and when loads are most uniformly distributed on the screw side or the nut side, the grinding taper angle $\gamma$ stops being increased, and the grinding taper angle at a stop moment is recorded as the optimal grinding taper angle $\gamma_{opt}$ of roller grinding.

Further, the process parameters of roller grinding in step 4 include a mounting angle $\lambda$ of a grinding wheel, a rotational speed $\omega_G$ of the grinding wheel, a rotational speed $\omega_R$ of a machined roller, and an axial movement speed $v_G$ of the grinding wheel; and an axial movement direction of the grinding wheel is a direction determined based on the optimal grinding taper angle $\gamma_{opt}$ in step 3.

Further, in step 4, the mounting angle $\lambda$ of the grinding wheel is the same as a helix angle of the machined roller, the rotational speed $\omega_G$ of the grinding wheel is determined by a machining capability of a machine tool and characteristics of the grinding wheel, and the rotational speed $\omega_R$ of the machined roller and the axial movement speed $v_G$ of the grinding wheel satisfy a relation of $v_G = \omega_R P_R$, and $P_R$ is a thread pitch of the machined roller.

Compared with the prior art, the present disclosure has beneficial technical effects:

According to the roller taper grinding method for a planetary roller screw mechanism provided in the present disclosure, in the case of a machining capability of an existing machine tool, the rollers can be efficiently machined with relatively low cost and technical difficulty, and the method is suitable for batch machining. In addition, the rollers machined through the technical solution of the present disclosure can effectively improve load distribution uniformity of the planetary roller screw mechanism, increase a bearing capacity thereof, reduce excessive localized wear of a surface of a thread, and prolong service life.

BRIEF DESCRIPTION OF THE DRAWINGS

The present disclosure will be further described below in combination with accompanying drawings.

Figure 1:
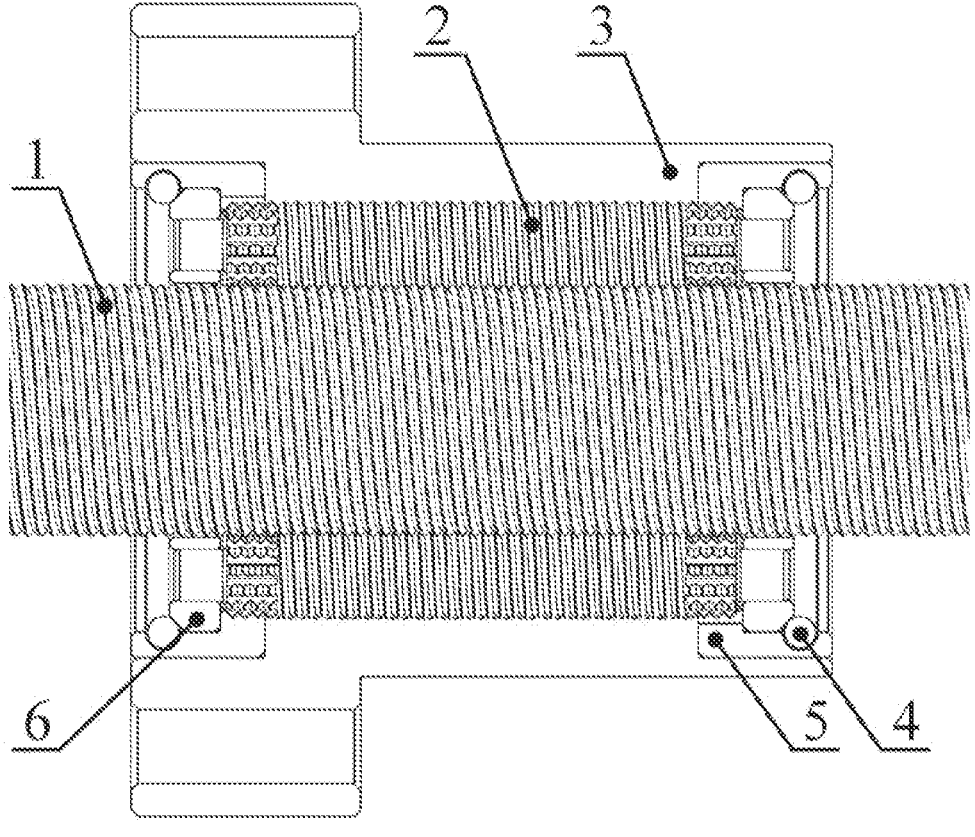
FIG. 1 is a schematic structural diagram of a planetary roller screw mechanism according to the background art of the present disclosure.
Figure 2:
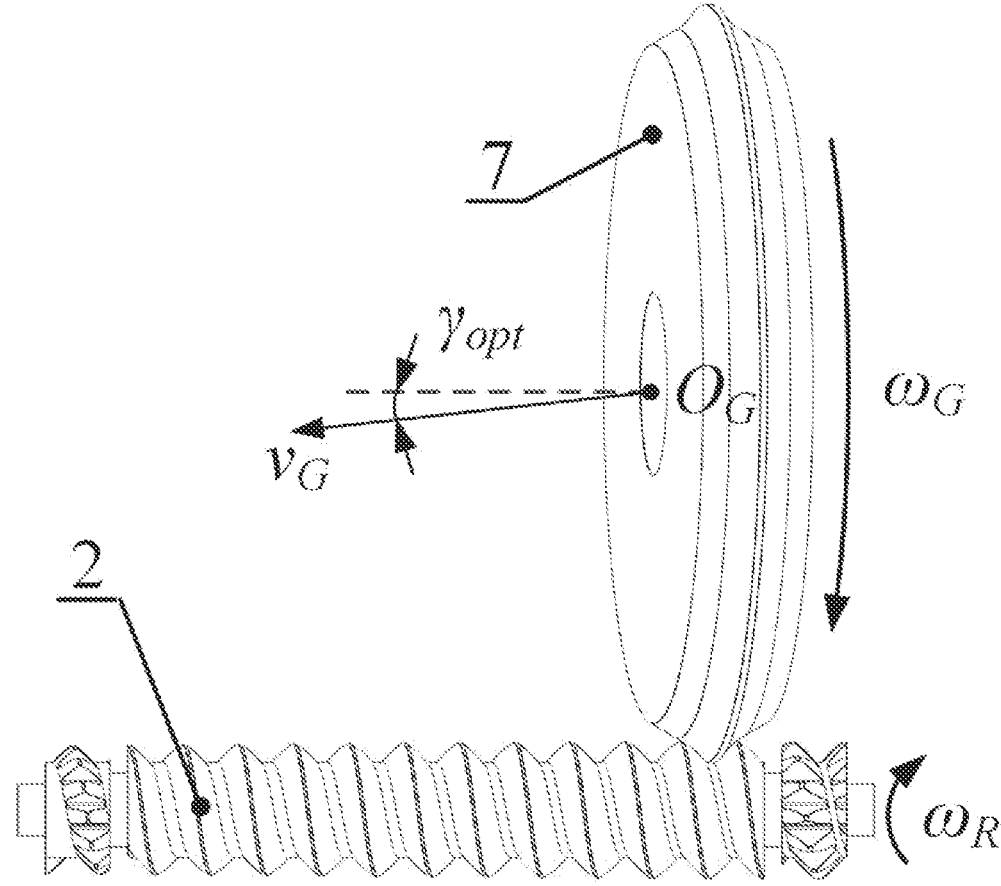
FIG. 2 is a schematic diagram of a front view of roller taper grinding according to detailed description of the embodiments of the present disclosure.
Figure 3:
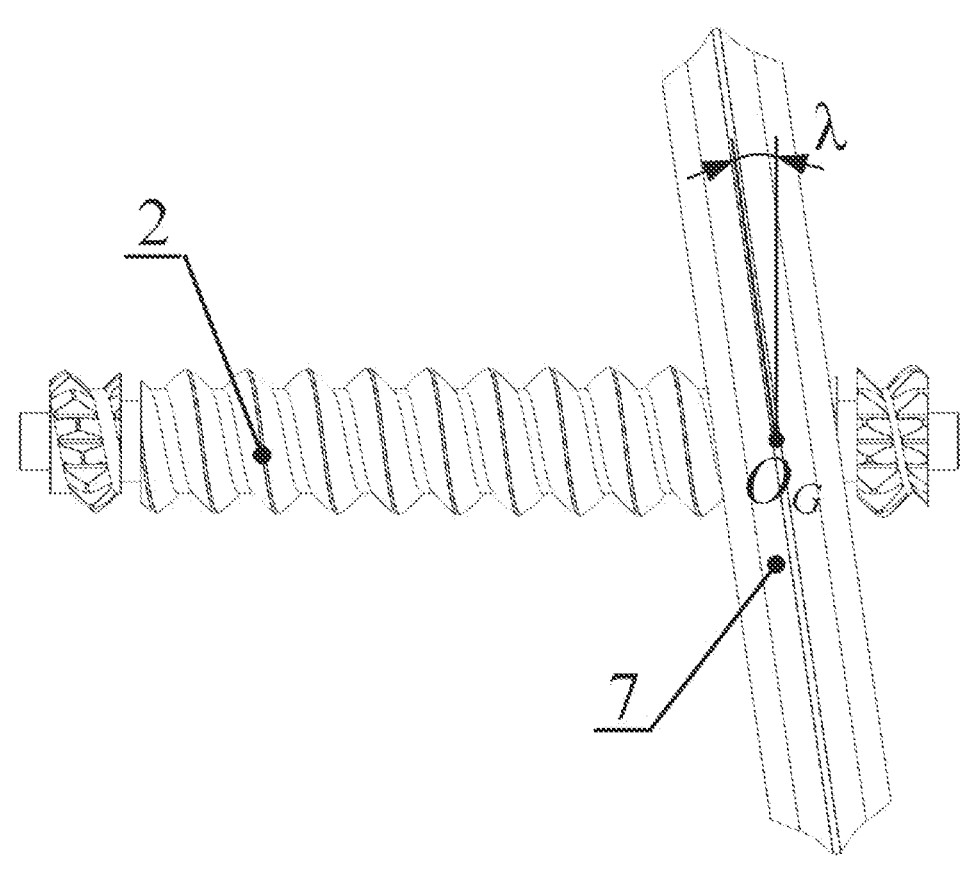
FIG. 3 is a schematic diagram of a top view of roller taper grinding according to detailed description of the embodiments of the present disclosure.
Figure 4:
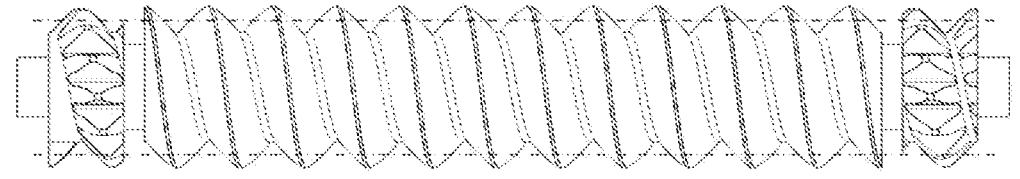
FIG. 4 is a roller not subjected to taper grinding according to detailed description of the embodiments of the present disclosure.
Figure 5:
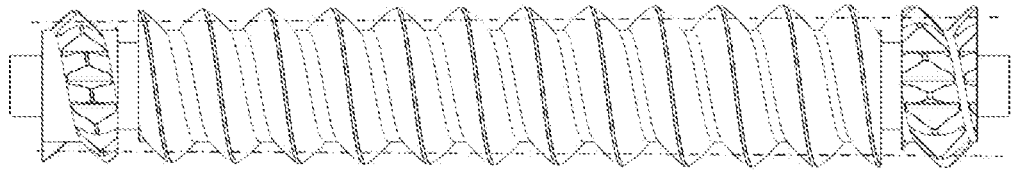
FIG. 5 is a roller subjected to taper grinding according to detailed description of the embodiments of the present disclosure.

Description of reference numerals: 1. screw, 2. roller, 3. nut, 4. retainer ring, 5. inner gear ring, 6. retainer, 7. grinding wheel, 8. thread after roller taper grinding, and 9. thread before taper grinding.

DETAILED DESCRIPTION OF THE EMBODIMENTS

The present disclosure will be described in further detail below in combination with accompanying drawings. The present disclosure will be described in further detail below in combination with accompanying drawings. The embodiments are implemented on the premise of the technical solution of the present disclosure, and detailed implementation modes are provided, but the scope of protection of the present disclosure is not limited to the following embodiments.

As shown in FIGS. 2-6, a roller taper grinding method for a planetary roller screw mechanism includes steps as follows:

step 1: determine basic parameters and a bearing capacity of a planetary roller screw mechanism to be machined, where specifically, the basic parameters of the planetary roller screw mechanism include major diameters, nominal diameters, minor diameters, thread angles, helix angles, thread pitches, thread starts of a screw, a roller and a nut, an external diameter of the nut, an arc radius of the roller, number of rollers, and number of threads per roller In the embodiment, the bearing capacity is 30 kN, and specific values of the basic parameters are as shown in Table 1:

TABLE 1

| Basic parameters of planetary roller screw mechanism in embodiment | | | |
|---|---|---|---|
| Parameter | Screw | Roller | Nut |
| Major diameter (mm) | 19.875 | 6.875 | 32.95 |
| Nominal diameter (mm) | 19.5 | 6.5 | 32.5 |
| Minor diameter (mm) | 19.05 | 6.05 | 32.125 |
| Thread angle (°) | 90 | 90 | 90 |
| Helix angle (°) | 4.66 | 2.8 | 2.8 |
| Thread pitch (mm) | 1 | 1 | 1 |
| Thread starts | 5 | 1 | 5 |
| External diameter of nut (mm) | \ | \ | 42 |
| Arc radius of roller (mm) | \ | 9.19 | \ |
| Number of rollers (mm) | \ | 10 | \ |
| Number of threads per roller | \ | 30 | \ |

Step 2: establish deformation and force balance equations of the planetary roller screw mechanism according to the basic parameters and the bearing capacity of the planetary roller screw mechanism determined in step 1:

$$\begin{cases} P_S + \Delta l_{Si} = P_R + \Delta l_{SRi} \pm P_R \tan \gamma \\ P_N + \Delta l_{Ni} = P_R + \Delta l_{NRi} \pm P_R \tan \gamma \\ \sum_{i=1}^{N_t} F_{SRi} = \dfrac{F}{Z_R} \\ \sum_{i=1}^{N_t} F_{NRi} = \dfrac{F}{Z_R} \end{cases}$$

where $P_S$, $P_R$ and $P_N$ are the thread pitches of the screw, the roller and the nut respectively; i is a thread number of the roller, i=1, 2, 3, . . . , $N_t$, and $N_t$ is number of threads per roller; $\Delta l_{Si}$ and $\Delta l_{Ni}$ are axial deformation at an $i_{th}$ segment of the screw and the nut respectively; $\Delta l_{SRi}$ and $\Delta l_{NRi}$ are axial deformation of the roller on a screw side and a nut side respectively; $\gamma$ is a grinding taper angle of the roller; $F_{SRi}$ and $F_{NRi}$ are axial forces borne by an $i_{th}$ thread on the screw side and the nut side respectively; F is a load value of the planetary roller screw mechanism; $Z_R$ is a number of rollers; and ± indicates a tension and compression state of the screw or the nut, + indicates tension, and − indicates compression.

Step 3: iteratively compute an optimal grinding taper angle of roller grinding according to the deformation and force balance equations established in step 2, where a specific computation process is: the grinding taper angle $\gamma$ of the roller in the deformation and force balance equations in step 2 is gradually increased from 0, and corresponding axial forces $F_{SRi}$ and $F_{NRi}$ borne by the thread on the screw side and the nut side may be obtained in the case of any $\gamma$; and when loads are most uniformly distributed on the screw side or the nut side, the grinding taper angle $\gamma$ stops being increased, and the grinding taper angle at a stop moment is recorded as the optimal grinding taper angle $\gamma_{opt}$ of roller grinding.

Through computation, in the embodiment, when the grinding angle is 0.014°, loads are most uniformly distributed on the screw side. Therefore, the optimal grinding taper angle of roller grinding in the embodiment is $\gamma_{opt}$=0.014°.

Step 4: determine process parameters of roller grinding, where as shown in FIGS. 2-5, the process parameters of roller grinding include a mounting angle $\lambda$ of a grinding wheel 7 on a machine tool, a rotational speed $\omega_G$ of the grinding wheel, a rotational speed $\omega_R$ of a machined roller, and an axial movement speed $v_G$ of the grinding wheel; and an axial movement direction of the grinding wheel is a direction determined based on the optimal grinding taper angle $\gamma_{opt}$ in step 3.

The mounting angle $\lambda$ of the grinding wheel is the same as a helix angle of the machined roller, the rotational speed $\omega_G$ of the grinding wheel is determined by a machining capability of a machine tool and characteristics of the grinding wheel, and the rotational speed $\omega_R$ of the machined roller and the axial movement speed $v_G$ of the grinding wheel satisfy a relation of $v_G = \omega_R P_R$, and $P_R$ is a thread pitch of the machined roller.

In the embodiment, the mounting angle of the grinding wheel is $\lambda$=2.8°, the rotational speed of the grinding wheel is $\omega_G$=1500 rpm, the rotational speed of the machined roller is $\omega_R$=15 rpm, and the axial movement speed of the grinding wheel is $v_G$=15 mm/min.

Figure 6:
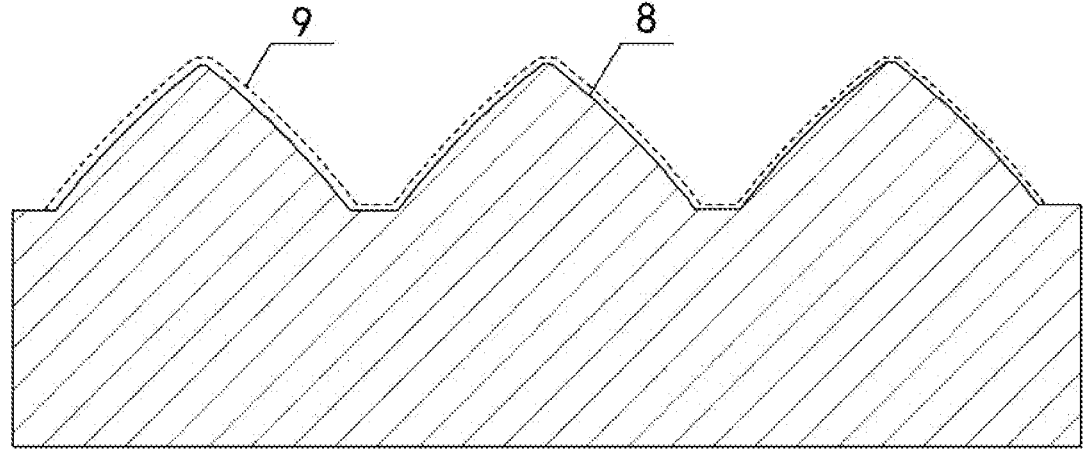
FIG. 6 is a schematic comparison diagram of types of part of threads of a roller subjected to taper grinding and not subjected to taper grinding according to detailed description of the embodiments of the present disclosure.

Step 5: grind a roller taper of the planetary roller screw mechanism by the machine tool according to the process parameters determined in step 4, where as shown in FIG. 6, as the grinding wheel 7 axially moves, a thickness of a thread 8 after roller taper grinding is gradually reduced compared with a thickness of a thread 9 before taper grinding, and a reduction amount reserves a space for the thread to deform under a load. Therefore, according to the roller taper grinding method for a planetary roller screw mechanism provided in the present disclosure, load distribution uniformity of the planetary roller screw mechanism can be effectively improved, and the technical solution has the advantages of low cost, high feasibility, high efficiency, etc.

Again, the above-mentioned embodiments are only intended to describe the preferred implementation modes of the present disclosure, but not to limit the scope of the present disclosure. Various alterations and improvements made by those of ordinary skill in the art based on the technical solution of the present disclosure without departing from the design spirit of the present disclosure shall fall within the scope of protection determined by the claims of the present disclosure.

What is claimed is:

1. A roller taper grinding method for a planetary roller screw mechanism, comprising steps as follows step 1: determining basic parameters and a bearing capacity of a planetary roller screw mechanism to be machined;

step 2: establishing deformation and force balance equations of the planetary roller screw mechanism according to the basic parameters and the bearing capacity of the planetary roller screw mechanism determined in step 1;

step 3: iteratively computing an optimal grinding taper angle of roller grinding according to the deformation and force balance equations established in step 2;

step 4: determining process parameters of roller grinding wherein the process parameters include an axial movement direction of a grinding wheel which is determined based on the optimal grinding taper angle computed in step 3; and step 5: grinding a roller taper of the planetary roller screw mechanism by a machine tool according to the process parameters determined in step 4, wherein the machine tool includes the grinding wheel;

wherein the basic parameters of the planetary roller screw mechanism in step 1 comprise major diameters, nominal diameters, minor diameters, thread angles, helix angles, thread pitches, thread starts of a screw, a roller and a nut, an external diameter of the nut, an arc radius of the roller, number of rollers, and number of threads per roller, wherein the deformation and force balance equations of the planetary roller screw mechanism established in step 2 are:

$$\begin{cases} P_S + \Delta l_{Si} = P_R + \Delta l_{SRi} \pm P_R \tan \gamma \\ P_N + \Delta l_{Ni} = P_R + \Delta l_{NRi} \pm P_R \tan \gamma \\ \sum_{i=1}^{N_t} F_{SRi} = \dfrac{F}{Z_R} \\ \sum_{i=1}^{N_t} F_{NRi} = \dfrac{F}{Z_R} \end{cases}$$

wherein $P_S$, $P_R$ and $P_N$ are the thread pitches of the screw, the roller and the nut respectively; i is a thread number of the roller, i=1, 2, 3, . . . $N_t$, and $N_t$ is the number of threads per roller; $\Delta l_{Si}$ and $\Delta l_{Ni}$ are axial deformation at an ith segment of the screw and the nut respectively; $\Delta l_{SRi}$ and $\Delta l_{NRi}$ are axial deformation of the roller on a screw side and a nut side respectively; $\gamma$ is a grinding taper angle of the roller; $F_{SRi}$ and $F_{NRi}$ are axial forces borne by an ith thread on the screw side and the nut side respectively; F is a load value of the planetary roller screw mechanism; $Z_R$ is the number of rollers; and ± indicates a tension and compression state of the screw or the nut, + indicates tension, and − indicates compression.

2. The roller taper grinding method for a planetary roller screw mechanism claim 1, wherein in step 3 of iteratively computing the optimal grinding taper angle according to the deformation and force balance equations established in step 2, the grinding taper angle $\gamma$ of the roller in the deformation and force balance equations in step 2 is gradually increased from 0, and corresponding axial forces $F_{SRi}$ and $F_{NRi}$ borne by the thread on the screw side and the nut side are capable of being obtained in the case of any $\gamma$; and when loads are most uniformly distributed on the screw side or the nut side, the grinding taper angle $\gamma$ stops being increased, and the grinding taper angle at a stop moment is recorded as the optimal grinding taper angle $\gamma_{opt}$ of roller grinding.

3. The roller taper grinding method for a planetary roller screw mechanism according to claim 2, wherein the process parameters of roller grinding in step 4 comprise a mounting angle $\lambda$ of the grinding wheel, a rotational speed $\omega_G$ of the grinding wheel, a rotational speed $\omega_R$ of a machined roller, and an axial movement speed $v_G$ of the grinding wheel.

4. The roller taper grinding method for a planetary roller screw mechanism according to claim 3, wherein in step 4, the mounting angle $\lambda$ of the grinding wheel is the same as a helix angle of the machined roller, the rotational speed $\omega_G$ of the grinding wheel is determined by a machining capability of a machine tool and characteristics of the grinding wheel, the rotational speed $\omega_R$ of the machined roller and the axial movement speed $v_G$ of the grinding wheel satisfy a relation of $v_G = \omega_R P_R$, and $P_R$ is a thread pitch of the machined roller.

* * * * *